2,911,432

SUBSTITUTED PHENYL-CYANO-CYCLO-HEXANONES

Willard M. Hoehn, Wilmette, Ill., assignor to G. D. Searle & Co., Chicago, Ill., a corporation of Delaware No Drawing. Application April 7, 1958
Serial No. 726,610

6 Claims. (Cl. 260—465)

The present invention relates to substituted phenyl-cyclohexanone derivatives having the structure

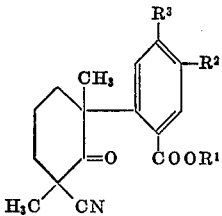

wherein $R^1$ can represent hydrogen or lower alkyl, $R^2$ can represent isopropyl or acetyl and $R^3$ can represent hydrogen or benzoyl. The term lower alkyl can represent such alkyl radicals as methyl, ethyl, propyl, butyl, pentyl, hexyl, heptyl, octyl and branched chain isomers thereof.

Satisfactory starting materials for the production of the compounds of the invention are dehydroabietonitrile and 6-benzoyldehydroabietonitrile. For the preparation of the compounds of the invention the desired starting material is subjected to oxidation with chromium trioxide in aqueous acetic acid solution at moderate temperatures such as between room temperature and about 75°. After the oxidation is complete the reaction mixture is diluted with water, the precipitate thus formed is recovered, treated with dilute alkaline solution, filtered or centrifuged and the filtrate acidified to produce a precipitate which is crystallized from aqueous methanol.

The compounds of the invention are useful because of their absorption of ultraviolet light in the region responsible for erythemal effects. The compounds may be incorporated in standard vehicles suitable for application to the human skin to produce compositions adapted to prevent sunburning, for example, a one percent solution in corn oil applied to the skin gives good protection against burning by sunlight. They also may be incorporated in suitable plastic films useful for screening out harmful ultraviolet radiation for the protection of packaged goods.

In the following examples are shown several specific embodiments of the present invention but it should be understood that the invention is not to be limited to the specific reactions disclosed nor to the precise proportions or conditions set forth since the examples are given only for the purpose of illustration. Quantities are expressed in parts by weight and parts by volume which bear the same relation one to another as kilograms to liters. Temperatures are expressed in degrees centigrade.

Example 1

To a solution of 85 parts by weight of dehydroabietonitrile and 45 parts by volume of benzoyl chloride in 200 parts by volume of nitrobenzene and 500 parts by volume of chlorobenzene is added slowly 85 parts by weight of aluminum chloride while keeping the temperature of the mixture between 5–10°. The reaction mixture is stirred for four hours during which time the temperature is allowed to rise to room temperature. After standing overnight the reaction mixture is poured onto 800 parts by weight of cracked ice and extracted with ether. The organic solution is washed successively with three portions of 500 parts by volume of water. The water washes are discarded, the ether and chlorobenzene are removed by evaporation in vacuo and the nitrobenzene removed by steam distillation. The residue in the flask, obtained by decantation of the water, is dissolved in chloroform, filtered and 95% alcohol added. The solid 6-benzoyldehydroabietonitrile, obtained by filtration, is crystallized from chloroform-alcohol; melting point 145–147.5°; ultraviolet absorption at 249 millimicrons, extinction coefficient 14,000; specific rotation in alcohol +69.5°.

A solution of 10 parts by weight of chromium trioxide, 8 parts by volume of water and 42 parts by volume of acetic acid is added slowly with stirring to a solution of 10 parts by weight of 6-benzoyldehydroabietonitrile dissolved in 50 parts by volume of acetic acid which has been warmed to 60°. The temperature quickly rises to about 70° and the addition of chromic acid solution is adjusted so as to maintain the temperature at between 68–72°. After all of the chromium trioxide solution has been added the reaction mixture is allowed to stand at room temperature for about 15 hours.

The reaction mixture is diluted with an equal volume of water, filtered, the solid residue washed with about 100 parts by volume of water and the filtrate and washings discarded. The solid is suspended in about 150 parts by volume of 5% sodium hydroxide solution, heated to 55–60° for about 10 minutes, filtered, and the solid residue washed with water. The combined filtrate and washings are poured into about 400 parts by volume of 2% hydrochloric acid solution. The material which precipitates is collected on a filter, washed with water and crystallized from dilute methanol to yield 2-cyano-2,6-dimethyl - 6 - (3 - benzoyl - 6 - carboxy - 4 - isopropylphenyl)cyclohexanone. After drying in a vacuum oven to constant weight the product melts at 226–228°, has a specific rotation of +44.2° in chloroform, exhibits absorption maxima in the ultraviolet at 255 and 290 millimicrons and has the formula

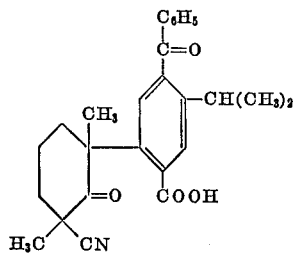

A solution of diazomethane in ether solution (prepared from 3 parts by weight of nitrosomethylurea) is added to 1 part by weight of 2-cyano-2,6-dimethyl-6-(3-benzoyl-6-carboxy-4-isopropylphenyl)cyclohexanone and the resulting solution permitted to stand at room temperature for 3 hours. The resinous residue obtained after the evaporation of ether and excess diazomethane is dissolved in methanol and poured into ten times its volume of water. The solid precipitate thus formed is filtered, washed with water and dried in vacuo at 60° to yield 2-cyano-2,6-dimethyl - 6 - (3 - benzoyl - 6 - methoxycarbonyl - 4 - isopropylphenyl)cyclohexanone which exhibits absorption maxima in the ultraviolet at 253.5 and an inflection at 285 millimicrons. The compound has the structure

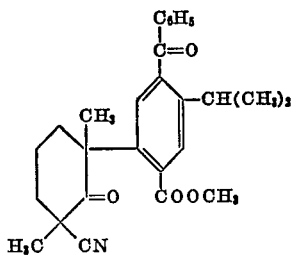

Example 2

A solution of 160 parts by weight of chromium trioxide in 90 parts by volume of water and 800 parts by volume of acetic acid is added dropwise with stirring to a solution of 56 parts by weight of dehydroabietonitrile which has been dissolved in 800 parts by volume of acetic acid and warmed to 70°. The chromium trioxide solution is added at such a rate that the temperature is maintained at about 70°; approximately 7 hours are required for the addition. The reaction mixture is cooled to 15° and a solution of 60 parts by volume of methanol in 500 parts by volume of water added. The solution is then concentrated under reduced pressure to about one-third of the original volume and after 1000 parts by volume of water is added the concentration is continued to about 500 parts by volume. During the concentration a gummy layer forms in the distillation flask. The aqueous layer is decanted and both the gummy residue and aqueous layer are extracted with ether. The ether extracts are combined, washed with water until neutral and then extracted with 2% sodium hydroxide solution. The alkaline extract is acidified to Congo red with ten percent hydrochloric acid solution and the aqueous layer decanted from the gummy layer which forms. The gummy layer is washed with warm water and dissolved in 15 parts by volume of ether to which 15 parts by a volume of petroleum ether (boiling point 68–70°) is added. The solution is permitted to evaporate during which crystalline material appears which is collected, crystallized from ether-petroleum ether and then from methanol-water. The product, 2-cyano-2,6-dimethyl-6-(2-carboxy-4-isopropylphenyl)cyclohexanone, after drying at 80° in vacuo for one hour melts at 156–158° and exhibits absorption in the ultraviolet at 243.5 and 293 millimicrons. The product has the formula

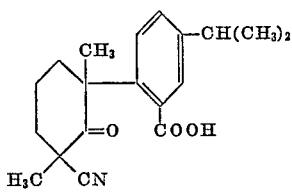

The mother liquors are combined, the solvents removed and the residue dissolved in a mixture of benzene and ether. The solvents are removed by distillation and the gum which remains is dissolved in benzene and chromatographed over a column of silica gel which has been previously washed with benzene. The column is eluted with 20,000 parts by volume of ethyl acetate and benzene (1:19) to yield, after removing the solvent from the eluate, 2-cyano-2,6-dimethyl-6-(2-carboxy-4-isopropylphenyl)cyclohexanone. Further elution of the column with 14,000 parts by volume of ethyl acetate-benzene solution (1:4) yields 2-cyano-2,6-dimethyl-6-(2-carboxy-4-acetylphenyl)cyclohexanone, melting point 187–188° and exhibiting absorption maxima in the ultraviolet at 291– 299 millimicrons with an inflection at 247 millimicrons. The compound has the structure

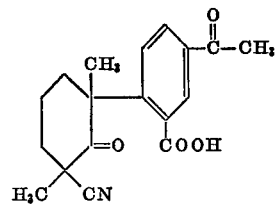

An excess of diazomethane in ether is added to 1.5 parts by weight of 2-cyano-2,6-dimethyl-6-(2-carboxy-4-isopropylphenyl)cyclohexanone and allowed to stand for 2 hours. The mixture is then concentrated to dryness and the oily residue crystallized from methanol to yield 2-cyano - 2,6 - dimethyl - 6 - (2 - methoxycarbonyl - 4 - isopropylphenyl)cyclohexanone melting at 130–131° and exhibiting absorption maxima in the ultraviolet at 238.5–285 millimicrons and having the structure

Example 3

A mixture of 2-cyano-2,6-dimethyl-6-(3-benzoyl-6-carboxy-4-isopropylphenyl)cyclohexanone, 250 parts by volume of ethanol and 2 parts by weight of concentrated sulfuric acid is stirred for 30 minutes at room temperature followed by heating at reflux for 2 hours. The reaction mixture is poured into 500 parts by volume of water and extracted successively with three 200 parts by volume portions of ether. The combined ether extracts are washed with sodium bicarbonate solution to neutrality, dried over anhydrous magnesium sulfate and the ether removed to yield 2-cyano-2,6-dimethyl-6-(3-benzoyl - 6 - ethoxycarbonyl - 4 - isopropylphenyl)cyclohexanone as a gum which absorbs in the ultraviolet at 254 millimicrons with an inflection at 285 millimicrons.

Example 4

A mixture of 2-cyano-2,6-dimethyl-6-(2-carboxy-4-isopropylphenyl)cyclohexanone, 600 parts by volume of normal butanol and 12 parts by weight of concentrated sulfuric acid is stirred at room temperature for 25 minutes and then heated on the steam bath for 2 hours. The reaction mixture is poured into 600 parts by volume of water and extracted successively with 3 portions of 200 parts by volume of ether. The combined ether extracts are washed to neutrality with sodium bicarbonate solution and dried over anhydrous magnesium sulfate. The solvent is removed in vacuo to leave a residue of 2-cyano - 2,6 - dimethyl - 6 - (2 - butoxycarbonyl - 4 - isopropylphenyl)cyclohexanone which exhibits ultraviolet absorption at 254.5 millicrons.

What is claimed is:
1. A compound of the formula

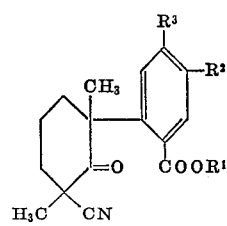

wherein $R^1$ is a radical selected from the group consisting of H and lower alkyl, R² is a radical selected from the group consisting of isopropyl and acetyl and R³ is a radical selected from the group consisting of H and benzoyl.

2. 2 - cyano - 2,6 - dimethyl - 6 - (3 - benzoyl - 6 - carboxy-4-isopropylphenyl)cyclohexanone.

3. 2 - cyano - 2,6 - dimethyl - 6 - (3 - benzoyl - 6-methoxycarbonyl-4-isopropylphenyl)cyclohexanone.

4. 2 - cyano - 2,6 - dimethyl - 6 - (2 - carboxy - 4 - isopropylphenyl)cyclohexanone.

5. 2 - cyano - 2,6 - dimethyl - 6 - (2 - carboxy - 4-acetylphenyl)cyclohexanone.

6. 2 - cyano - 2,6 - dimethyl - 6 - (2 - methoxycarbonyl-4-acetylphenyl)cyclohexanone.

References Cited in the file of this patent

UNITED STATES PATENTS

| | | |
|---|---|---|
| 2,534,297 | Putnam | Dec. 19, 1950 |
| 2,750,367 | Sanderson | June 12, 1956 |
| 2,750,368 | Sanderson | June 12, 1956 |
| 2,750,402 | Sanderson | June 12, 1956 |
| 2,816,907 | Hoehn | Dec. 17, 1957 |
| 2,842,559 | Johnson et al. | July 8, 1958 |